US012603203B2

(12) United States Patent
Eguchi et al.

(10) Patent No.: US 12,603,203 B2
(45) Date of Patent: Apr. 14, 2026

(54) METHOD OF MANUFACTURING Sm—Fe—N MAGNET, Sm—Fe—N MAGNET, AND MOTOR HAVING Sm—Fe—N MAGNET

(71) Applicant: IHI Corporation, Tokyo (JP)

(72) Inventors: Haruki Eguchi, Tokyo (JP); Akihiro Nomura, Tokyo (JP); Natsuki Yoneyama, Tokyo (JP); Hiroo Takahashi, Tokyo (JP); Osamu Harasaki, Tokyo (JP); Hiroki Yoshizawa, Tokyo (JP); Isao Nakanowatari, Tokyo (JP)

(73) Assignee: IHI Corporation, Tokyo (JP)

( * ) Notice: Subject to any disclaimer, the term of this patent is extended or adjusted under 35 U.S.C. 154(b) by 1349 days.

(21) Appl. No.: 17/209,326

(22) Filed: Mar. 23, 2021

(65) Prior Publication Data

US 2021/0210996 A1 Jul. 8, 2021

Related U.S. Application Data

(63) Continuation of application No. PCT/JP2019/036758, filed on Sep. 19, 2019.

(30) Foreign Application Priority Data

Oct. 9, 2018 (JP) ................................ 2018-190870

(51) Int. Cl.
*H01F 1/059* (2006.01)
*B22F 3/00* (2021.01)
(Continued)

(52) U.S. Cl.
CPC .............. *H01F 1/059* (2013.01); *B22F 3/004* (2013.01); *H01F 41/0266* (2013.01); *H01F 41/0273* (2013.01); *B22F 3/18* (2013.01)

(58) Field of Classification Search
CPC .................................. B22F 3/18; H01F 1/059
See application file for complete search history.

(56) References Cited

U.S. PATENT DOCUMENTS 2,994,917 A * 8/1961 Fritsch ..................... B22F 3/18 425/449
4,080,726 A * 3/1978 Neimanns ................ H05B 3/52 29/613

(Continued)

FOREIGN PATENT DOCUMENTS

CN 1353428 A 6/2002
CN 105225780 A 1/2016

(Continued)

OTHER PUBLICATIONS

Machine Translation of JP-2005353653-A (Year: 2005).*

(Continued)

*Primary Examiner* — Keith Walker
*Assistant Examiner* — Stephani Hill
(74) *Attorney, Agent, or Firm* — Oblon, McClelland, Maier & Neustadt, L.L.P.

(57) ABSTRACT

A method of manufacturing an Sm—Fe—N magnet includes filling a metal sheath with a magnet powder including an Sm—Fe—N compound as a main component and sealing the metal sheath, applying a magnetic field to the magnet powder sealed in the metal sheath, and magnetizing the magnet powder by magnetically orienting the magnet powder and aligning a direction of magnetic orientation in one direction, preliminarily rolling the magnetically oriented magnet powder sealed in the metal sheath to make the magnetically oriented magnet powder into a green compact, and pressurizing the green compact sealed in the metal sheath and densifying the green compact to form a magnet body, wherein the preliminary rolling is performed by lightly rolling the magnetically oriented magnet powder sealed in (Continued)

the metal sheath with a pressure smaller than a pressure for pressurizing the green compact.

6 Claims, 9 Drawing Sheets

(51) Int. Cl.
*B22F 3/18* (2006.01)
*H01F 41/02* (2006.01)

(56) References Cited

U.S. PATENT DOCUMENTS 4,447,467 A 5/1984 Oguchi et al.
4,921,551 A * 5/1990 Vernia ................ B65D 75/5877 148/120
5,480,601 A * 1/1996 Yamamoto ........... B23K 35/327 419/3
6,165,413 A * 12/2000 Lo ........................ C23C 14/3414 419/49
2001/0016977 A1* 8/2001 Moro ......................... B22F 7/08 29/606
2002/0084440 A1 7/2002 Ohmori et al.
2002/0129872 A1* 9/2002 Ohashi .................. H01F 1/0596 148/301
2004/0113118 A1* 6/2004 Kamoi .................... H01F 1/083 264/429
2005/0208164 A1* 9/2005 Ugai ................... H01F 41/0266 425/3
2008/0066575 A1* 3/2008 Yang ................... C22C 33/0257 75/229
2015/0059932 A1 3/2015 Hirano et al.
2015/0132175 A1* 5/2015 Hasegawa ............. B30B 11/027 419/38
2015/0179320 A1* 6/2015 Furusawa ................. B22F 7/02 419/62
2018/0342338 A1* 11/2018 Egashira ................. H01F 1/059

FOREIGN PATENT DOCUMENTS

JP 06-108111 A 4/1994
JP 07-153612 A 6/1995
JP 09237730 A * 9/1997 ........... H01F 1/0576
JP 2002-270416 A 9/2002
JP 2003-007521 A 1/2003
JP 2005-340261 A 12/2005
JP 2005353653 A * 12/2005
JP 2012-241280 A 12/2012
JP 2016-082175 A 5/2016
JP 2017-098411 A 6/2017
JP 2017-216298 A 12/2017
JP 2018012891 A * 1/2018

OTHER PUBLICATIONS

Machine Translation of JP-2018012891-A (Year: 2018).*
Office Action issued Jun. 17, 2022, in corresponding Chinese Patent Application No. 201980064562.3 (with English Translation of Category of Cited Documents), 7 pages.
Extended European Search Report issued Aug. 7, 2022, in corresponding European Patent Application No. 19870224.3, 8 pages.
Japanese Decision to Grant issued May 9, 2023 in Japanese Patent Application No. 2020-550287, 1 page.
International Search Report issued Dec. 3, 2019 in PCT/JP2019/036758 filed on Sep. 19, 2019, 2 pages.
Combined Chinese Office Action and Search Report issued Sep. 30, 2022 in Chinese Patent Application No. 201980064562.3, 6 pages.

* cited by examiner

METHOD OF MANUFACTURING Sm—Fe—N MAGNET, Sm—Fe—N MAGNET, AND MOTOR HAVING Sm—Fe—N MAGNET

CROSS REFERENCE TO RELATED APPLICATIONS

This application is a continuation application of International Application No. PCT/JP2019/036758, filed on Sep. 19, 2019, which claims priority to Japanese Patent Application No. 2018-190870, filed on Oct. 9, 2018, the entire contents of which are incorporated by references herein.

BACKGROUND

1. Field

The present disclosure relates to a method of manufacturing an Sm—Fe—N magnet, the Sm—Fe—N magnet, and a motor having the Sm—Fe—N magnet.

2. Description of the Related Art

Sm—Fe—N magnets have excellent magnetic properties and corrosion resistance. Sm—Fe—N compounds forming Sm—Fe—N magnets are known to pyrolyze at high temperatures. It is thus difficult to manufacture bulk magnets of Sm—Fe—N magnets by sintering at high temperatures. Accordingly, as a method of manufacturing an Sm—Fe—N magnet without sintering process, a method of manufacturing an Sm—Fe—N magnet by rolling has been proposed. See Japanese Patent Application Publication No. 2005-340261.

SUMMARY

The Sm—Fe—N magnet manufactured by rolling as described above obtains a certain degree of magnetic properties. It is however awaited to further improve the magnetic properties. Such Sm—Fe—N magnet is applicable to, for example, a motor of mobile objects, such as automobiles and aircraft, generators, rotating machines, industrial robots, and the like.

Accordingly, an object of the present disclosure is to provide a method of manufacturing an Sm—Fe—N magnet that further improves magnetic properties, the Sm—Fe—N magnet, and a motor having the Sm—Fe—N magnet.

A method of manufacturing an Sm—Fe—N magnet according to the present disclosure includes a sealing step of filling a metal sheath with a magnet powder containing an Sm—Fe—N compound as a main component and sealing the metal sheath, a magnetic field applying step of applying a magnetic field to the magnet powder sealed in the metal sheath and magnetizing the magnet powder by magnetically orienting the magnet powder and aligning a direction of magnetic orientation in one direction, a preliminary rolling step of preliminarily rolling the magnetically oriented magnet powder sealed in the metal sheath to make the magnetically oriented magnet powder into a green compact, and a pressurizing step of pressurizing the green compact sealed in the metal sheath and densifying the green compact to form a magnet body, wherein in the preliminary rolling step, the preliminary rolling is performed by lightly rolling the magnetically oriented magnet powder sealed in the metal sheath with a pressure smaller than a pressure in the pressurizing step.

In the method of manufacturing an Sm—Fe—N magnet according to the present disclosure, in the sealing step, the magnet powder filled in the metal sheath may be tapped by vibration and then sealed.

In the method of manufacturing an Sm—Fe—N magnet according to the present disclosure, in the preliminary rolling step, the magnetically oriented magnet powder sealed in the metal sheath may be preliminarily rolled in a direction orthogonal to the direction of magnetic orientation.

In the method of manufacturing an Sm—Fe—N magnet according to the present disclosure, in the preliminary rolling step, the magnetically oriented magnet powder sealed in the metal sheath may be preliminarily rolled at room temperature.

In the method of manufacturing an Sm—Fe—N magnet according to the present disclosure, in the pressurizing step, the green compact sealed in the metal sheath may be pressurized at room temperature or heated to 700° C. or less and then pressurized.

A method of manufacturing an Sm—Fe—N magnet according to the present disclosure includes a sealing step of filling a metal sheath with a magnet powder containing an Sm—Fe—N compound as a main component and sealing the metal sheath after tapping by vibration the magnet powder filled in the metal sheath, a magnetic field applying step of applying a magnetic field to the magnet powder sealed in the metal sheath and magnetizing the magnet powder by magnetically orienting the magnet powder and aligning a direction of magnetic orientation in one direction, and a pressurizing step of pressurizing the magnetically oriented magnet powder sealed in the metal sheath and densifying the magnetically oriented magnet powder to form a magnet body.

In the method of manufacturing an Sm—Fe—N magnet according to the present disclosure, in the pressurizing step, the magnetically oriented magnet powder sealed in the metal sheath may be pressurized at room temperature or heated to 700° C. or less and then pressurized.

In the method of manufacturing an Sm—Fe—N magnet according to the present disclosure, in the pressurizing step, the pressurizing may be press forming or rolling.

In the method of manufacturing an Sm—Fe—N magnet according to the present disclosure, in the pressurizing step, the pressurizing may be rolling and the rolling may be performed in a direction orthogonal to the direction of magnetic orientation.

An Sm—Fe—N magnet according to the present disclosure includes an Sm—Fe—N compound as a main component and has a relative density of 52% or more to 88% or less and a degree of magnetic orientation of 0.72 or more to 0.87 or less.

The Sm—Fe—N magnet according to the present disclosure includes an Sm—Fe—N compound as a main component, the relative density may be 67% or more to 88% or less, and the degree of magnetic orientation may be 0.72 or more to 0.82 or less.

The Sm—Fe—N magnet according to the present disclosure includes an Sm—Fe—N compound as a main component, the relative density may be 77% or more to 88% or less, and the degree of magnetic orientation may be 0.73 or more to 0.82 or less.

An Sm—Fe—N magnet according to the present disclosure includes an Sm—Fe—N compound as a main component and has a relative density of 68% or more to 70% or less and a degree of magnetic orientation of 0.74 or more to 0.76 or less.

A motor according to the present disclosure includes the Sm—Fe—N magnet manufactured according to any one of the above-described methods of manufacturing an Sm—Fe—N magnet.

A motor according to the present disclosure includes any one of the above-described Sm—Fe—N magnets.

According to the above configuration, the magnetic characteristics of the Sm—Fe—N magnet is improved.

DESCRIPTION OF EMBODIMENTS

First Embodiment

Figure 1:
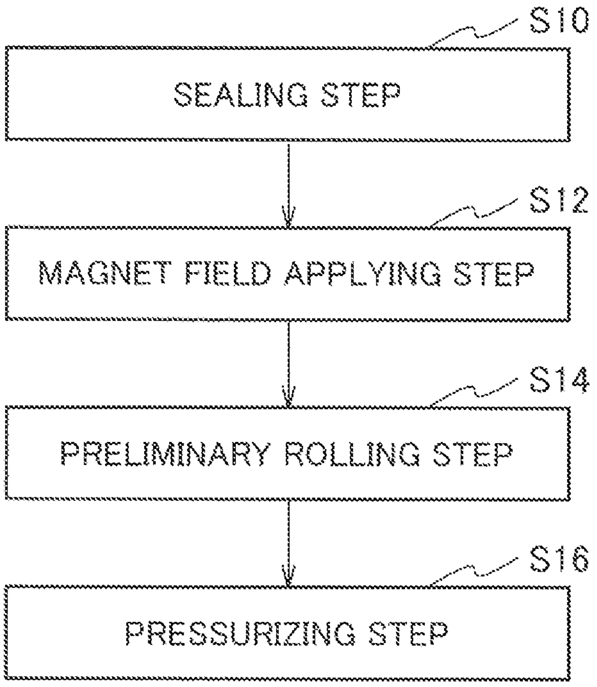
FIG. 1 is a flowchart illustrating a configuration of a method of manufacturing an Sm—Fe—N magnet according to a first embodiment of the present disclosure.

A first embodiment of the present disclosure is described below with reference to the drawings. FIG. 1 is a flowchart illustrating a configuration of a method of manufacturing an Sm—Fe—N magnet. The method of manufacturing an Sm—Fe—N magnet includes a sealing step (S10), a magnetic field applying step (S12), a preliminary rolling step (S14), and a pressurizing step (S16).

The sealing step (S10) is a step of filling a metal sheath with a magnet powder having an Sm—Fe—N compound as a main component and sealing the metal sheath.

The magnet powder includes an Sm—Fe—N compound as a main component. The Sm—Fe—N compound is a compound including Sm, Fe and N. As the Sm—Fe—N compound, for example, $Sm_2Fe_{17}N_x$ may be used. $Sm_2Fe_{17}N_x$ is a magnetic material formed from nitride. $Sm_2Fe_{17}N_x$ is excellent in magnetic characteristics. The nitrogen amount x in $Sm_2Fe_{17}N_x$ can be, for example, $0<x\leq6$. The nitrogen amount x in $Sm_2Fe_{17}N_x$ may be $1\leq x\leq6$, $2\leq x\leq3$, or $2.5\leq x\leq3$. $Sm_2Fe_{17}N_x$ may be $Sm_2Fe_{17}N_3$ (Nitrogen amount x is 3).

The Sm—Fe—N compound includes Sm, Fe and N and may include other elements. Other elements may be, for example, Co, Ni, Zr, Cu, Ti, Hf, Zn, B, C, or the like. Of course, the Sm—Fe—N compound may include Sm, Fe and N, and the balance being unavoidable impurities.

The magnet powder includes an Sm—Fe—N compound as a main component. The main component is a component having the highest content among the components constituting the magnet powder. The content of the Sm—Fe—N compound in the magnet powder may be 50% by mass or more, 70% by mass or more, or 90% by mass or more. Of course, the magnet powder may be formed of only the Sm—Fe—N compound. The magnet powder may include an additive, such as an organic antifriction agent. The magnet powder may be coated with a resin or the like.

The particle size of the magnet powder can be 50 μm or less and may be 10 μm or less. The magnet powder may be a powder formed by crushing an Sm—Fe—N compound or the like by a jet mill or the like. The magnet powder may be a commercially available powder or the like.

Figure 2:
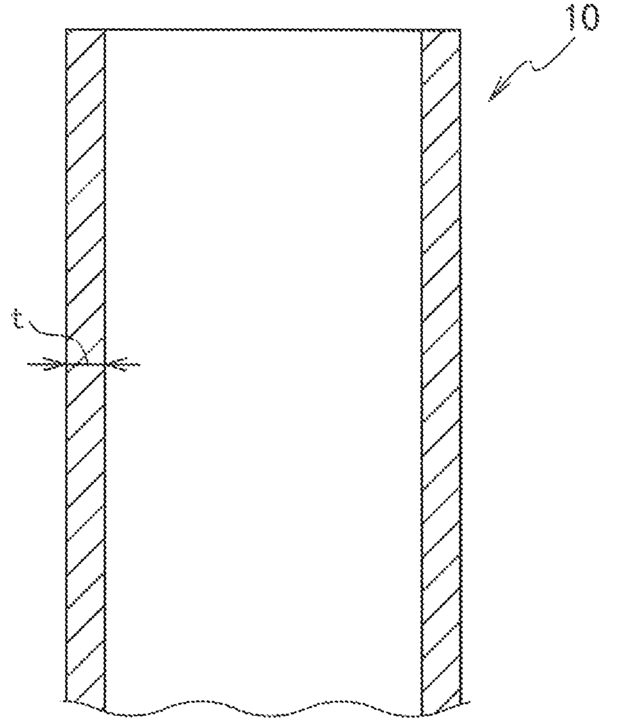
FIG. 2 is a cross-section view illustrating a configuration of a metal sheath in the first embodiment of the present disclosure.

The magnet powder is filled in the metal sheath. FIG. 2 is a cross-sectional view illustrating the configuration of a metal sheath 10. The metal sheath 10 may be cylindrical or cylindrical with a bottom, for example. The sectional shape of the metal sheath 10 is not limited. The sectional shape of the metal sheath 10 may be circular, flat, rectangular, or the like. The metal sheath 10 may be a long sheath, for example. The material of the metal sheath 10 is not limited. An aluminum material, a stainless steel material or the like can be used as the material of the metal sheath 10. As the stainless steel material, an austenitic stainless steel, a ferritic stainless steel, an austenite-ferritic stainless steel, a martensitic stainless steel, a precipitation hardening type stainless steel or the like may be used. An austenitic stainless steel, such as SUS304, may be used as the stainless material. When the material of the metal sheath 10 is an aluminum material or a stainless steel material and a thickness t of the metal sheath 10 is 0.5 mm or more, it is possible to apply a load more uniformly to the magnet powder or the like in the preliminary rolling step (S14) and the pressurizing step (S16) described later.

After the magnet powder is filled in the metal sheath 10, an end portion of the metal sheath 10 is sealed. In a method of sealing the metal sheath 10, the end portion of the metal sheath 10 may be sealed by being crushed by a manual press, such as a vise, and pressure-bonded. Also, in a method of sealing the metal sheath 10, the end portion of the metal sheath 10 may be folded back to be sealed. Moreover, in a method of sealing the metal sheath 10, the end portion of the metal sheath 10 may be welded to be sealed.

Figure 3:
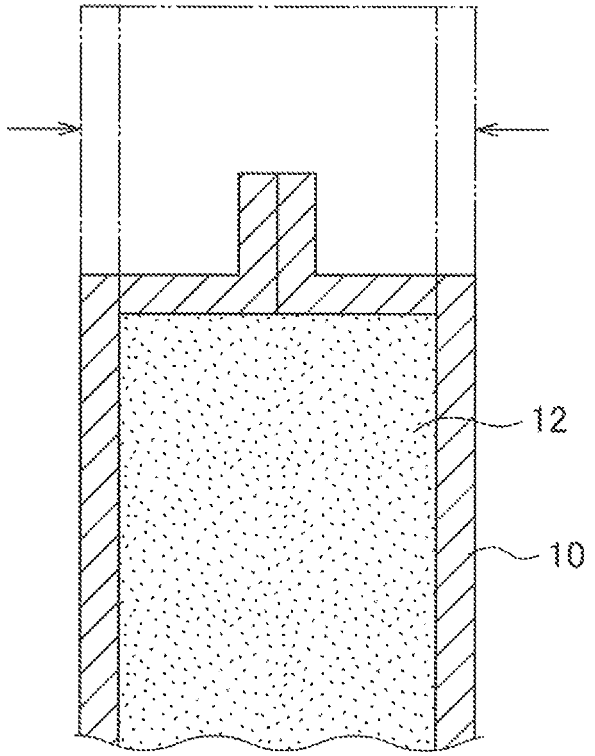
FIG. 3 is a schematic diagram illustrating a metal sheath with its end portion sealed after filled with a magnet powder in the first embodiment of the present disclosure.

The metal sheath 10 may be sealed by filling the magnet powder in the metal sheath 10 without gaps. FIG. 3 is a schematic diagram illustrating the metal sheath 10 with the end portion sealed after filled with a magnet powder 12. Filling the metal sheath 10 with the magnet powder 12 without gaps prevents the magnet powder 12 that is magnetically oriented from moving in the direction of magnetic orientation or the like in the preliminary rolling step (S14) described later. FIG. 3 illustrates a method of filling the metal sheath 10 with the magnet powder 12 without gaps and sealing by pressure-bonding a part of the metal sheath 10 by a vise or the like, the part being not filled with the magnet powder 12. Arrow in FIG. 3 indicate a press position to be pressed by a vise or the like. By pressing the part of the metal sheath 10 that is not filled with the magnet powder 12, the metal sheath 10 is sealed without applying a load to the magnet powder 12.

Figure 4:
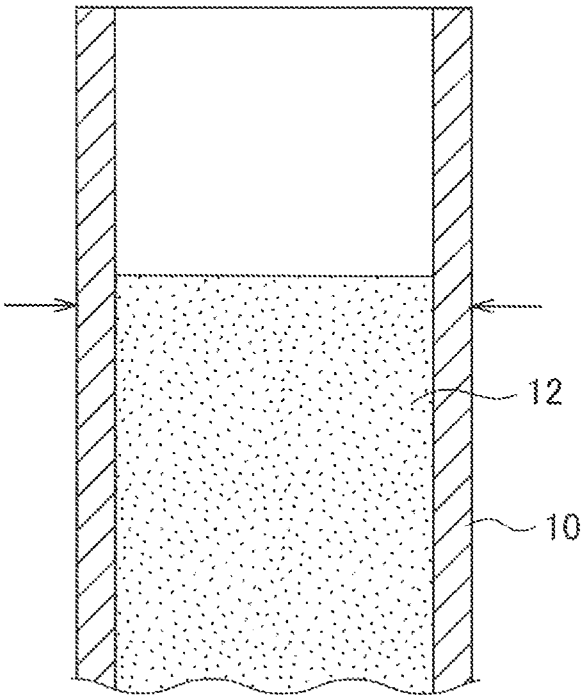
FIG. 4 is a schematic diagram illustrating a method of sealing the metal sheath by pressing a part of the metal sheath, the part filled with the magnet power, in the first embodiment of the present disclosure.

Further, to the extent that there is little effect on the bulk density or the like of the magnet powder 12 filled in the metal sheath 10, a part of the metal sheath 10, the part being filled with the magnet powder 12, may be pressed so that the metal sheath 10 is filled with the magnet powder 12 without gaps. FIG. 4 is a schematic diagram illustrating a method of sealing the metal sheath 10 by pressing a part of the metal sheath 10, the part being filled with the magnet powder 12. FIG. 4 illustrates a method of filling the metal sheath 10 with the magnet powder 12 without gaps and sealing the metal sheath 10 by pressure-bonding a part of the metal sheath 10 by a vise or the like, the part being filled with the magnet powder 12. Arrow in FIG. 4 indicate a press position to be pressed by a vise or the like. In this manner, to the extent that there is little effect on the magnet powder 12 filled in the metal sheath 10, the part of the metal sheath 10 filled with the magnet powder 12 may be pressed to seal the metal sheath 10.

In the sealing step (S10), the metal sheath 10 may be sealed after the magnet powder 12 filled therein is tapped by vibration. Tapping by vibration the magnet powder 12 filled in the metal sheath 10 reduce gaps between particles of the magnet powder 12 so as to increase the relative density of the magnet powder 12 filled in the metal sheath 10.

More specifically, when the magnet powder 12 filled in the metal sheath 10 is not tapped by vibration, the relative density of the magnet powder 12 is about 20%. In contrast, when the magnet powder 12 filled in the metal sheath 10 is tapped by vibration, the relative density of the magnet powder 12 can be set to 25% or more. The relative density of the magnet powder 12 may be set to 50% or more by tapping.

The relative density of the magnet powder 12 filled in the metal sheath 10 is calculated by the ratio of the bulk density ρ of the magnet powder 12 to the theoretical density A of the magnet powder 12 ($\rho/A\times100$). The bulk density ρ of the magnet powder 12 is calculated by $p=M/V$, where V is the volume of the metal sheath 10 and M is the mass of the magnet powder 12 filled in the metal sheath 10. The theoretical density A of the magnet powder 12 may be calculated from the crystal structure or the like. For example, when the magnet powder 12 is $Sm_2Fe_{17}N_3$, the theoretical density A is 7.68 (g/cm$^3$). The theoretical density A is taken from PAULING FILE Multinaries Edition—2012.

The method of tapping is not limited as long as the magnet powder 12 filled in the metal sheath 10 can vibrate. For example, tapping may be performed by manually vibrating the magnet powder 12 filled in the metal sheath 10 in the vertical direction. When a tapping apparatus is used, for example, a tapping apparatus or the like indicated in JIS Z2512 or ASTM B527 may be used.

The magnetic field applying step (S12) is a step of applying a magnetic field to the magnet powder 12 sealed in the metal sheath 10 and magnetizing the magnet powder 12 by magnetically orienting the magnet powder 12 and aligning a direction of magnetic orientation in one direction. This provides the Sm—Fe—N magnet with anisotropy. Magnetically orientating the magnet powder 12 in a powdery state enables the magnet powder 12 to move easily. Thus, it is easy to align a direction of magnetic orientation of the magnet powder 12 in one direction.

By magnetically orienting the magnet powder 12 and aligning the direction of magnetic orientation in one direction, an axis of easy magnetization of the magnet powder 12 is aligned in one direction. For example, when the magnet powder 12 is $Sm_2Fe_{17}N_3$, the axis of easy magnetization of $Sm_2Fe_{17}N_3$ is the c-axis. The magnet powder 12 is magnetized by magnetically orienting the magnet powder 12 and aligning a direction of magnetic orientation in one direction. This makes the magnetization direction of the magnet powder 12 the same as the direction of magnetic orientation.

The method of applying a magnetic field to the magnet powder 12 may be performed by a pulse magnetic field or a static magnetic field. The method of applying a magnetic field to the magnet powder 12 may be performed by a DC magnetic field. The magnetic field applied to the magnet powder 12 can be 1 T (0.80 MA/m) or more to 15 T (11.94 MA/m) or less and may be 3 T (2.39 MA/m) or more to 8 T (6.37 MA/m) or less. This is because when the magnetic field applied to the magnet powder 12 becomes larger than 15 T (11.94 MA/m), there may be a restriction on the device for applying the magnetic field. Application of a magnetic field to the magnet powder 12 can be performed at room temperature.

The preliminary rolling step (S14) is a step of preliminarily rolling the magnetically oriented magnet powder 12 sealed in the metal sheath 10 to make the magnetically oriented magnet powder 12 into a green compact.

The magnetically oriented magnet powder 12 sealed in the metal sheath 10 is preliminarily rolled, and the magnetically oriented magnet powder 12 is made into a green compact. The preliminary rolling is performed with a pressure capable of forming the magnetically oriented magnet powder 12 into a green compact. Preliminarily rolling the magnetically oriented magnet powder 12 into a green compact restricts the movement of the magnetically oriented magnet powder 12 to maintain the magnetically oriented direction. Moreover, preliminary rolling the magnetically oriented magnet powder 12 in a powdery state can fill gaps between particles of the magnetically oriented magnet powder 12 during the pressurization in preliminary rolling. It is thus possible to form the green compact densely.

Figure 5:
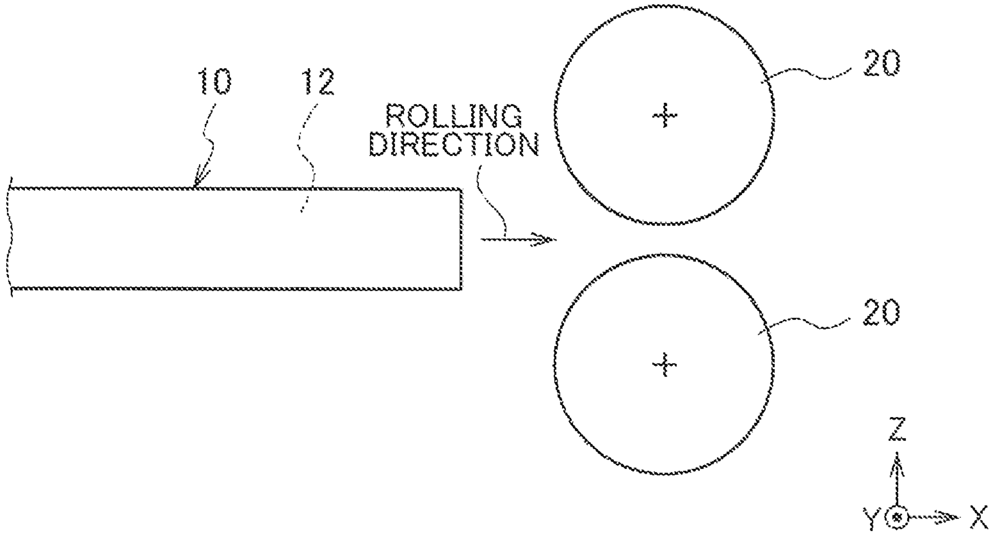
FIG. 5 is a diagram illustrating a preliminary rolling step in the first embodiment of the present disclosure.

When the magnetically oriented magnet powder 12 is filled in the metal sheath 10 without gaps, a denser green compact is obtained. The reason for this is described in detail. FIG. 5 is a diagram illustrating the preliminary rolling step (S14). In FIG. 5, an XYZ orthogonal coordinate system is set, and the description is made with reference to the XYZ coordinate system. In the XYZ coordinate system, a predetermined direction in the horizontal plane is defined as the X-axis direction, a direction orthogonal to the X-axis direction in the horizontal plane is defined as the Y-axis direction, and a direction orthogonal to the X-axis direction and the Y-axis direction (vertical direction) is defined as the Z-axis direction.

In FIG. 5, the magnetically oriented magnet powder 12 sealed in the metal sheath 10 is preliminarily rolled by a pair of rolling rolls 20. The rolling direction of the preliminary rolling is indicated by an arrow. The rolling direction of the preliminary rolling is the X-axis direction. The pressurizing direction by the pair of rolling rolls 20 is the Z-axis direction. Since the magnetically oriented magnet powder 12 is filled in the metal sheath 10 without gaps, most of the movement of the magnetically oriented magnet powder 12 during preliminary rolling is in the pressurizing direction (Z-axis direction). This prevents the magnetically oriented magnet powder 12 from moving in the rolling direction (X-axis direction) and the plate width direction (Y-axis direction) orthogonal to the pressurizing direction (Z-axis direction). Thus, it is possible to provide a denser green compact and suppress the disturbance of the magnetically oriented magnet powder 12.

In contrast, when the magnetically oriented magnet powder 12 is filled in the metal sheath 10 with gaps, the periphery of the magnetically oriented magnet powder 12 is not restricted by the metal sheath 10, and thus the movement of the magnetically oriented magnet powder 12 in the rolling direction (X-axis direction) and the plate width direction (Y-axis direction) orthogonal to the pressurizing direction (Z-axis direction) is not prevented. When there are gaps in the vicinity of the seal part, which is an end portion of the metal sheath 10, or the like, the movement of the magnetically oriented magnet powder 12 in the rolling direction (X direction) is not prevented. Thus, when the magnetically oriented magnet powder 12 is filled in the metal sheath 10 without gaps, a denser green compact is obtained.

Further, when the metal sheath 10 is filled with the magnetically oriented magnet powder 12 without gaps, the magnet can be manufactured without increasing the size of the rolling apparatus in the case of manufacturing a thick magnet. More specifically, in powder rolling where the powder is directly rolled, when the thickness of the manufacturable magnet is to be increased, the roll diameter of the rolling rolls 20 needs to be increased so that the powder does not escape due to the contact resistance between the powder and the rolling rolls 20 of the rolling apparatus and the powder enters between the rolling rolls 20. In contrast, the magnetically oriented magnet powder 12 is restricted in the metal sheath 10 because it is filled in the metal sheath 10 without gaps. Consequently, the magnetically oriented magnet powder 12 can enter between the rolling rolls 20 without escaping. In the case of manufacturing a thick magnet, it is not necessary to increase the roll diameter of the rolling rolls 20, so that it is not necessary to increase the size of the rolling apparatus. As described above, when the metal sheath 10 is filled with the magnetically oriented magnet powder 12 without gaps, the manufacturing cost is reduced when a thick magnet is manufactured.

In the preliminary rolling step (S14), the preliminary rolling is performed by light rolling with a pressure smaller than a pressure in the pressurizing step (S16) described later. This prevents disturbance of the magnetically oriented magnet powder 12 in the preliminary rolling. More specifically, in the preliminary rolling, the magnetically oriented magnet powder 12 is preliminarily rolled in a powdery state, so that particles of the magnetically oriented magnet powder 12 are not adhered to each other. Accordingly, when a large pressure, such as a pressure in the pressure step (S16), is applied to the magnetically oriented magnet powder 12 for forming the green compact, the magnetically oriented magnet powder 12 may be disturbed by the impact, and the direction of magnetic orientation of the magnetically oriented magnet powder 12 may be disturbed. In contrast, forming a green compact by lightly rolling the magnetically oriented magnet powder 12 with a pressure smaller than a pressure in the pressurizing step (S16) prevents the disturbance of the magnetically oriented magnet powder 12 and thus prevents the disturbance in the direction of magnetic orientation.

In the preliminary rolling, light rolling may be performed with a line load (rolling load/plate width) smaller than a line load (pressurizing load/plate width) of the pressurizing step (S16) described later. When the pressurizing step (S16) is performed by rolling, the preliminary rolling may be performed by light rolling with a line load (rolling load/plate width) smaller than a line load (rolling load/plate width) of the rolling in the pressurizing step (S16). When stainless steel is used for the metal sheath 10, the line load of the preliminary rolling may be 2450 (N/cm) or less. The preliminary rolling may be performed by light rolling, such as skin pass rolling.

Further, preliminary rolling of the magnetically oriented magnet powder 12 sealed in the metal sheath 10 improves the smoothness of the surface of the green compact sealed in the metal sheath 10. Thus, in the pressurizing step (S16) described later, when the green compact sealed in the metal sheath 10 is pressurized, the surface of the green compact sealed in the metal sheath 10 is more uniformly pressurized, so that the disturbance in the direction of magnetic orientation is prevented.

More specifically, for example, when the surface of the green compact sealed in the metal sheath 10 has roughness, a force tends to act in the inclined direction with respect to the pressurizing direction when the surface of the green compact sealed in the metal sheath 10 is pressurized in the pressurizing step (S16) described later, so that disturbance in the direction of magnetic orientation is more likely to occur. In contrast, when the surface of the green compact sealed in the metal sheath 10 is smooth, the force in the inclined direction is suppressed when the surface of the green compact sealed in the metal sheath 10 is pressurized, so that the disturbance in the direction of magnetic orientation is prevented.

Moreover, when the sectional shape of the metal sheath 10 is a non-rectangular shape, such as a circular shape, preliminary rolling makes the surface of the green compact sealed in the metal sheath 10 flat to form a flat plate shape. Thus, in the pressurizing step (S16) described later, when the surface of the green compact sealed in the metal sheath 10 is pressurized, the force acting in the inclined direction with respect to the pressurizing direction is suppressed, and the green compact is uniformly pressurized in the pressurizing direction.

Further, by preliminarily rolling the magnetically oriented magnet powder 12 sealed in the metal sheath 10, the green compact is continuously formed. This improves the productivity in preliminary rolling of the magnetically oriented magnet powder 12 sealed in the metal sheath 10, which is a long sheath, for example. The preliminary rolling may be cold rolling at room temperature. The preliminary rolling may be hot rolling by heating the magnetically oriented magnet powder 12 sealed in the metal sheath 10. Incidentally, the preliminary rolling may be cold rolling at room temperature. The cold rolling at room temperature has no need to heat the magnetically oriented magnet powder 12 sealed in the metal sheath 10 and thus improves the productivity.

Figure 6:
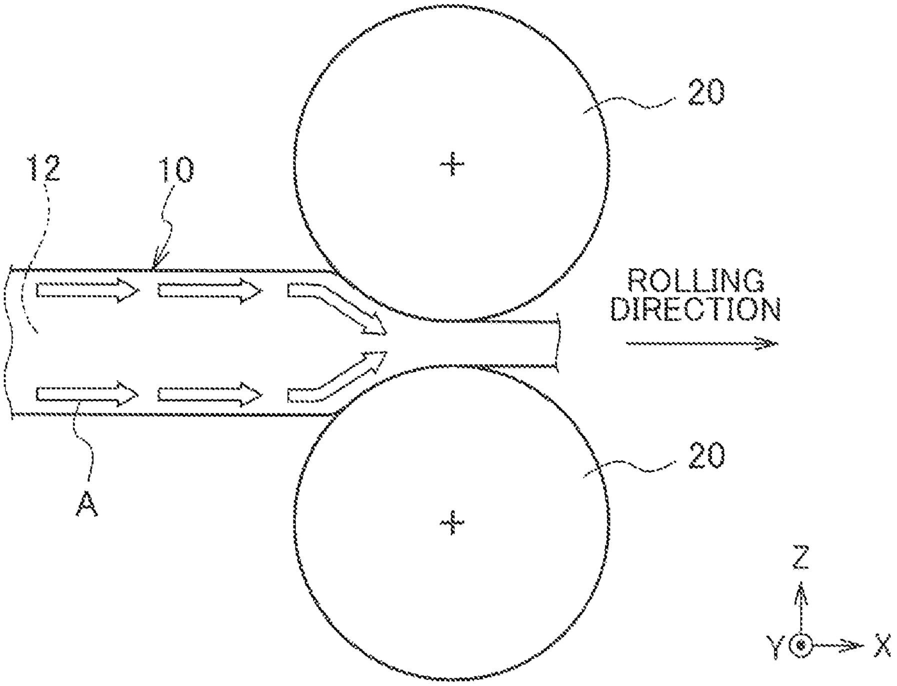
FIG. 6 is a diagram illustrating a case of preliminary rolling in a rolling direction parallel to a direction of magnetic orientation in the first embodiment of the present disclosure.
Figure 7:
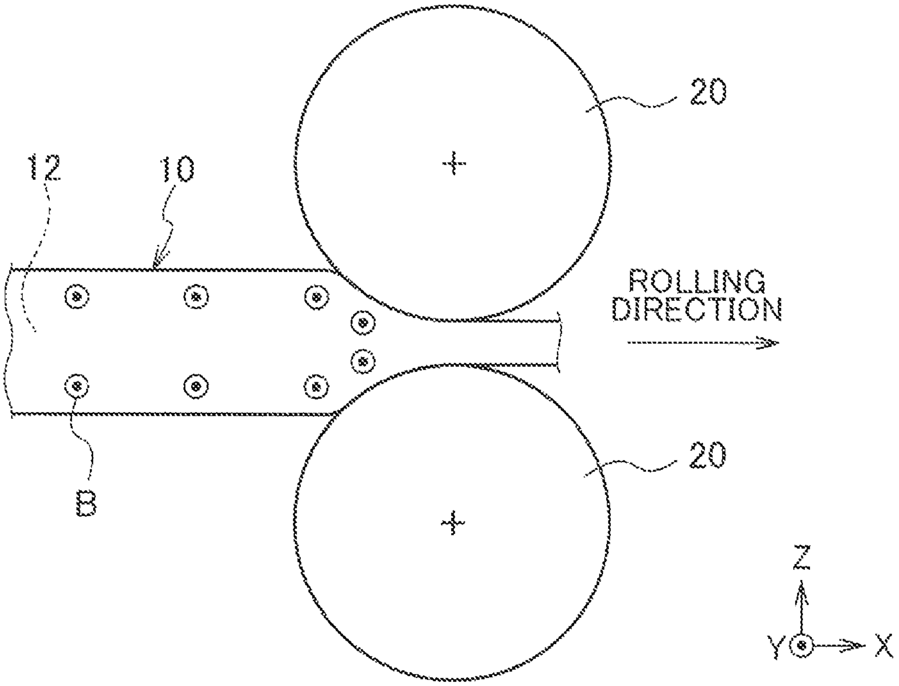
FIG. 7 is a diagram illustrating a case of preliminary rolling in a rolling direction orthogonal to a direction of magnetic orientation in the first embodiment of the present disclosure.

The rolling direction of the preliminary rolling is not limited. The rolling direction of the preliminary rolling may be orthogonal to the direction of magnetic orientation or parallel to the direction of magnetic orientation, for example. The rolling direction of the preliminary rolling may be orthogonal to the direction of magnetic orientation. Namely, the magnetically oriented magnet powder 12 sealed in the metal sheath 10 may be preliminarily rolled in a direction orthogonal to the direction of magnetic orientation. Thus, the disturbance of the magnetically oriented magnet powder 12 in the direction of magnetic orientation is suppressed. The reason for this is described in detail. FIG. 6 is a diagram illustrating a case of preliminary rolling in a rolling direction parallel to a direction of magnetic orientation. In FIG. 6, a direction of magnetic orientation is indicated by arrow A. FIG. 7 is a diagram illustrating a case of preliminary rolling in a rolling direction orthogonal to a direction of magnetic orientation. In FIG. 7, a direction of magnetic orientation is indicated by arrow B. In FIGS. 6 and 7, the same XYZ coordinate system as in FIG. 5 is adopted.

At the time of preliminary rolling, the magnetically oriented magnet powder 12 is subjected to an oblique deformation component due to superposition of a shearing force acting in the rolling direction (X-axis direction) and a rolling load acting in the pressurizing direction (Z-axis direction) orthogonal to the rolling direction (X-axis direction). For example, as illustrated in FIG. 6, when the rolling direction (X-axis direction) of the preliminary rolling is parallel to the direction of magnetic orientation (X-axis direction), the direction of magnetic orientation (X-axis direction) of the magnetically oriented magnet powder 12 is along the rolling direction (X-axis direction). Thus the direction of magnetic orientation (X-axis direction) of the magnetically oriented magnet powder 12 has a possibility of being obliquely curved when the magnetically oriented magnet powder 12 is inserted between the pair of rolling rolls 20. In contrast, as illustrated in FIG. 7, when the rolling direction (X-axis direction) of the preliminary rolling is orthogonal to the direction of magnetic orientation (Y-axis direction), the direction of magnetic orientation (Y-axis direction) of the magnetically oriented magnet powder 12 is orthogonal to the rolling direction (X-axis direction). Thus, the curvature of the direction of magnetic orientation (Y-axis direction) is prevented when the magnetically oriented magnet powder 12 is inserted between the pair of rolling rolls 20.

The rolling mill for preliminary rolling can be a general rolling mill for rolling metallic materials. When the metal sheath 10 is formed from stainless steel, appropriate shear force is applied to the magnetically oriented magnet powder 12. The end portion of the metal sheath 10 in the rolling direction may be formed in a round surface. Thus, the magnetically oriented magnet powder 12 sealed in the metal sheath 10 is easily inserted between the rolling rolls of a roll rolling mill or the like.

The pressurizing step (S16) is a step of pressurizing the green compact sealed in the metal sheath 10 and densifying the green compact to form a magnet body. The green compact sealed in the metal sheath 10 is pressurized, and the green compact is densified, thereby forming a magnet body. The pressurization of the green compact is performed by a pressing force capable of forming the green compact into a magnet body.

The pressurization can be performed by press forming or rolling. In the case of press forming, a press working machine, a hot press or the like used for press forming of a metal material or the like may be used. In the case of rolling, a general roll mill or the like for rolling a metal material can be used.

The pressurization may be performed by rolling. Since continuous processing is possible in rolling, the productivity is improved in pressurizing the green compact sealed in the metal sheath 10, which is a long sheath, for example. When the green compact sealed in the metal sheath 10 is rolled, the rolling reduction ratio can be 50% or more, and the rolling reduction ratio may be 75% or more. The number of times of rolling may be one, or rolling may be repeated a plurality of times. In the case of repeating the rolling, the pushing amount (amount of decrease) of a one-pass roll gap may be set to 0.3 mm, for example.

The rolling direction is not limited. The rolling direction may be a direction orthogonal to the direction of magnetic orientation or a direction parallel to the direction of magnetic orientation, for example. The rolling direction may be orthogonal to the direction of magnetic orientation. This is because the disturbance in the direction of magnetic orientation is suppressed for the same reason as the rolling direction of the preliminary rolling.

In the pressurization, the green compact sealed in the metal sheath 10 is pressurized with a pressure greater than a pressure of the preliminary rolling. By pressurizing the green compact sealed in the metal sheath 10 with a pressure greater than a pressure of the preliminary rolling, the green compact is densified to form a magnet body. Further, since particles of the magnetically oriented magnet powder 12 in the green compact sealed in the metal sheath 10 are adhered to each other, when the green compact is pressurized with a pressure greater than a pressure of the preliminary rolling, disturbance in the direction of magnetic orientation is suppressed.

The pressurization may be performed with a line load (pressurizing load/plate width) larger than the line load (rolling load/plate width) of the preliminary rolling. When the pressurization is performed by rolling, the rolling may be performed with a line load (rolling load/plate width) larger than the line load (rolling load/plate width) of the preliminary rolling. When the metal sheath 10 is formed from a stainless steel material, the line load in the pressurizing step (S16) may be set to be larger than 2450 (N/cm) to 196000 (N/cm) or less.

The pressurization may be performed at room temperature or by heating the green compact sealed in the metal sheath 10 to 700° C. or less. When the green compact sealed in the metal sheath 10 is pressurized at room temperature, it is not necessary to heat the green compact, so that the productivity is improved. When the green compact sealed in the metal sheath 10 is heated to 700° C. or less and pressurized, the green compact is further densified to form a magnet body. The heating temperature of the green compact sealed in the metal sheath 10 may be 200° C. or more to 700° C. or less, or 400° C. or more to 700° C. or less. The pressurization time may be 5 to 15 minutes, for example. Since the pressurization time is short as described above, the separation of N and thermal decomposition in the Sm—Fe—N compound is suppressed when the Sm—Fe—N compound is heated to 400° C. or more to 700° C. or less.

The atmosphere at the time of pressurization is not limited. The pressurization may be performed in the atmosphere, in a vacuum atmosphere, or in an inert gas atmosphere, such as argon gas. In the case of heating the green compact sealed in the metal sheath 10, since the green compact is sealed in the metal sheath 10 when pressurized in the atmosphere, oxidation of the green compact is prevented.

When the green compact sealed in the metal sheath 10 is heated, a stainless steel sheath may be used for the metal sheath 10. Since stainless steel has a thermal conductivity lower than those of copper and aluminum, the heat insulation property of the green compact is improved. In the heating method of the green compact sealed in the metal sheath 10, for example, the green compact sealed in the metal sheath 10 may be previously put into an electric furnace or the like and heated.

Figure 8:
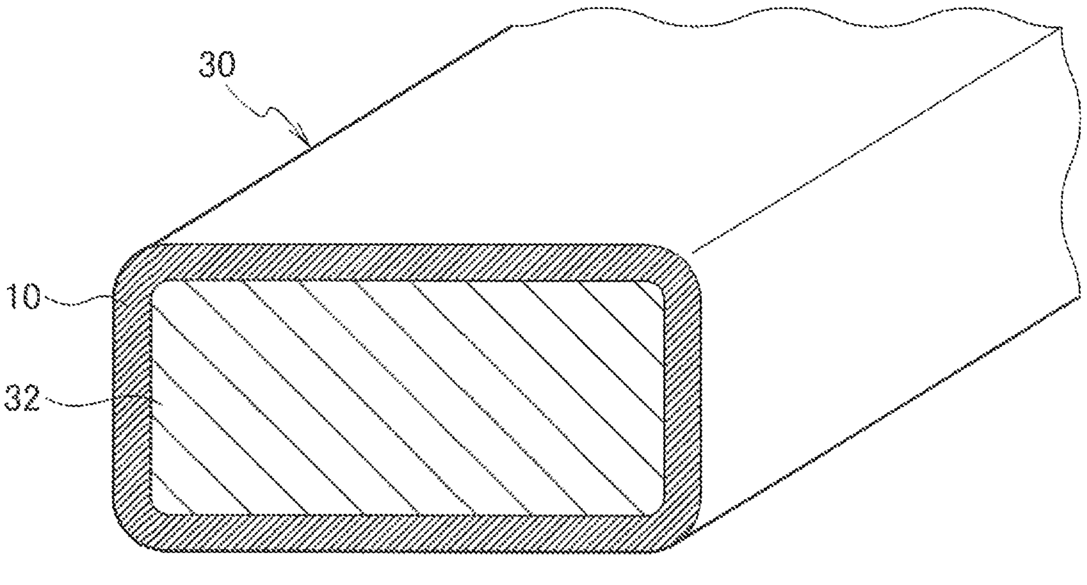
FIG. 8 is a diagram illustrating a configuration of a molded product after pressurizing step in the first embodiment of the present disclosure.

FIG. 8 is a diagram illustrating a configuration of a molded article 30 after the pressurizing step (S16). The molded article 30 is made up from a magnet body 32 sealed in the metal sheath 10. The metal sheath 10 is removed from the molded article 30 by machining or the like to take out the magnet body 32. Thus, the Sm—Fe—N magnet is manufactured.

Next, an Sm—Fe—N magnet manufactured by the above-described method of manufacturing an Sm—Fe—N magnet is described.

The Sm—Fe—N magnet is formed mainly from an Sm—Fe—N compound as a main component. The Sm—Fe—N magnet has a relative density of 52% or more to 88% or less and a degree of magnetic orientation of 0.72 or more to 0.87 or less. Thus, the residual magnetic flux density of the Sm—Fe—N magnet is set to 0.52 T or more to 0.92 T or less.

The relative density of the Sm—Fe—N magnet is calculated by the ratio of the density P of the Sm—Fe—N magnet to the theoretical density A of the magnet powder 12 (P/A×100). The density P of the Sm—Fe—N magnet may be calculated by measuring the size and mass of the Sm—Fe—N magnet or measured by an Archimedes method or the like. The theoretical density A of the magnet powder 12 may be calculated as described above.

Figure 9:
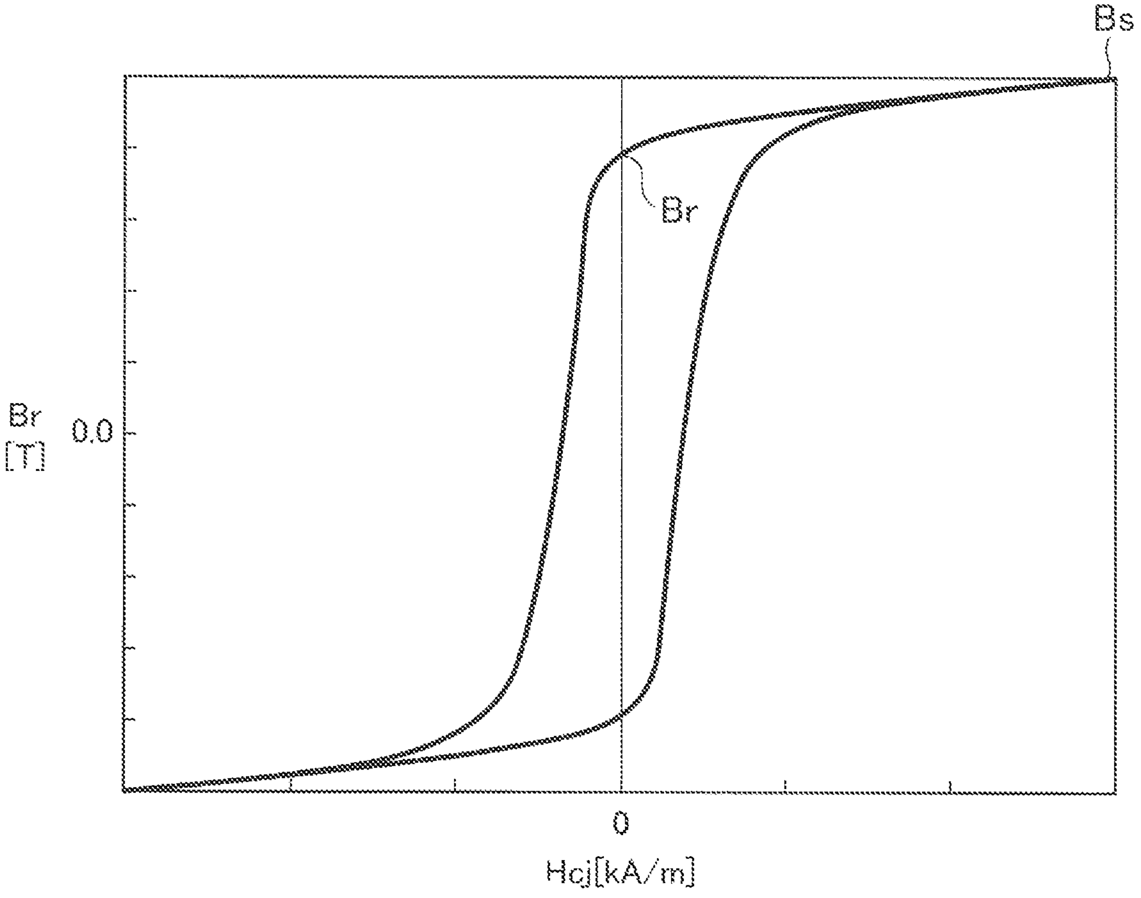
FIG. 9 is a graph illustrating a method of calculating the degree of magnetic orientation in the first embodiment of the present disclosure.

The degree of magnetic orientation of the Sm—Fe—N magnet is calculated as Br/Bs that is the ratio of the residual magnetic flux density Br to the saturation magnetic flux density Bs. FIG. 9 is a graph for illustrating a method of calculating the degree of magnetic orientation. First, a B-H curve, which is a magnetization curve of the Sm—Fe—N magnet, is measured. The saturation magnetic flux density Bs and the residual magnetic flux density Br are obtained from the B-H curve. Then, Br/Bs that is the degree of magnetic orientation is calculated. The degree of magnetic orientation indicates a similar tendency as the degree of crystal orientation. When the degree of magnetic orientation is high, the degree of crystal orientation tends to be high.

The Sm—Fe—N magnet manufactured by tapping in the sealing step (S10) is formed mainly from an Sm—Fe—N compound as a main component and has a relative density of 67% or more to 88% or less and a degree of magnetic orientation of 0.72 or more to 0.82 or less. Thus, the residual magnetic flux density of the Sm—Fe—N magnet is set to 0.54 T or more to 0.92 T or less. In the case of tapping in the sealing step (S10) as described above, the relative density of the Sm—Fe—N magnet is made larger.

The Sm—Fe—N magnet manufactured by tapping in the sealing step (S10) and preliminary rolling in the preliminary rolling step (S14) in the direction orthogonal to the direction of magnetic orientation is mainly formed from an Sm—Fe—N compound as a main component and has a relative density of 77% or more to 88% or less and a degree of magnetic orientation of 0.73 or more to 0.82 or less. Thus, the residual magnetic flux density of the Sm—Fe—N magnet is set to 0.78 T or more to 0.92 T or less. Thus, when tapping is performed in the sealing step (S10) and preliminary rolling is performed in the preliminary rolling step (S14) in the direction orthogonal to the direction of magnetic orientation, the residual magnetic flux density of the Sm—Fe—N magnet is further increased.

According to the method of manufacturing an Sm—Fe—N magnet having the above-described configuration and the Sm—Fe—N magnet, the magnetic characteristics of the Sm—Fe—N magnet is improved. The Sm—Fe—N magnet having the above-described configuration has excellent magnetic characteristics and thus is provided in a motor. The Sm—Fe—N magnet having the above-described configuration may be provided in a motor of a mobile body, such as an automobile or an aircraft, a generator, a rotating machine, an industrial robot, or the like.

Second Embodiment

Figure 10:
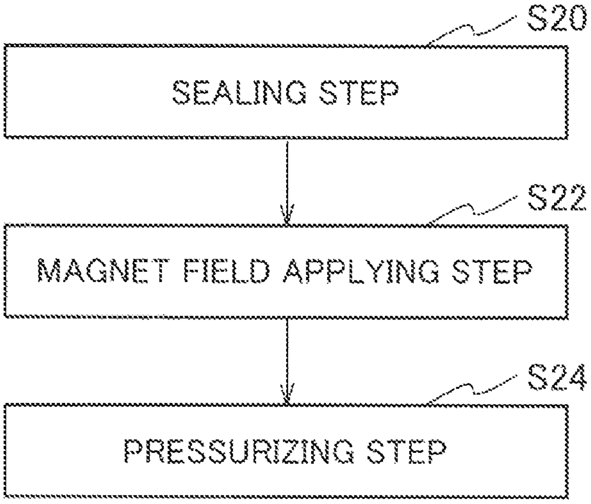
FIG. 10 is a flowchart illustrating a configuration of a method of manufacturing an Sm—Fe—N magnet according to a second embodiment of the present disclosure.

Next, a second embodiment of the present disclosure is described in detail with reference to the drawings. The second embodiment differs from the first embodiment mainly in that it does not include the preliminary rolling step (S14). FIG. 10 is a flowchart illustrating a configuration of a method of manufacturing an Sm—Fe—N magnet. A method of manufacturing an Sm—Fe—N magnet includes a sealing step (S20), a magnetic field applying step (S22), and a pressurizing step (S24). The same components are denoted by the same reference numerals, and a detailed description thereof is omitted.

The sealing step (S20) is a step of filling the metal sheath 10 with the magnet powder 12 mainly made from an Sm—Fe—N compound as a main component and sealing the metal sheath after tapping by vibration the magnet powder 12 filled in the metal sheath 10. The sealing step (S20) may be performed in the same manner as in the sealing step (S10) of the first embodiment, in which the magnet powder 12 filled in the metal sheath 10 is sealed after being tapped by vibration. The metal sheath 10 may be filled with the magnet powder 12 without gaps and sealed.

The magnetic field applying step (S22) is a step of applying a magnetic field to the magnet powder 12 sealed in the metal sheath 10 and magnetizing the magnet powder 12 by magnetically orienting the magnet powder 12 and aligning a direction of magnetic orientation in one direction. The magnetic field applying step (S22) may be performed in the same manner as the magnetic field applying step (S12) in the first embodiment.

The pressurizing step (S24) is a step of pressurizing the magnetically oriented magnet powder 12 sealed in the metal sheath 10 and densifying the magnetically oriented magnet powder 12 to form a magnet body. The magnetically oriented magnet powder 12 sealed in the metal sheath 10 is pressurized in a powdery state, and the magnetically oriented magnet powder 12 is densified to form a magnet body. Since the magnet powder 12 is tapped by vibration after being filled in the metal sheath 10, the magnet powder 12 is filled in the metal sheath 10 more closely than when the tapping is not performed. Thus, when the magnetically oriented magnet powder 12 sealed in the metal sheath 10 is pressurized in a powdery state, disturbance in the direction of magnetic orientation is suppressed as compared with the case where tapping is not performed. Further, when the magnetically oriented magnet powder 12 is filled in the metal sheath 10 without gaps, the movement of the magnetically oriented magnet powder 12 is restricted by the metal sheath 10. Thus, the disturbance in the direction of magnetic orientation is suppressed and the magnet body is formed more densely.

The pressurization can be performed by press forming or rolling. The pressurization may be performed at room temperature or by heating the magnetically oriented magnet powder 12 sealed in the metal sheath 10 to 700° C. or less. The heating temperature of the magnetically oriented magnet powder 12 sealed in the metal sheath 10 may be 200° C. or more to 700° C. or less, or 400° C. or more to 700° C. or less. The pressurizing method and the heating method may be performed in the same manner as the pressurizing method and the heating method in the pressurizing step (S16) of the first embodiment. The rolling direction in the case of rolling is not limited. The rolling direction in the case of rolling may be a direction orthogonal to the direction of magnetic orientation or a direction parallel to the direction of magnetic orientation, for example. The rolling direction may be orthogonal to the direction of magnetic orientation. This is because the disturbance of the magnetically oriented magnet powder 12 in the direction of magnetic orientation is suppressed for the same reason as the rolling direction of the preliminary rolling according to the first embodiment. After pressurization, the metal sheath 10 may be removed from the figuration may be provided in a motor of a mobile body, such as an automobile or an aircraft, a generator, a rotating machine, an industrial robot, or the like.

EXAMPLES

Sm—Fe—N magnets were manufactured, and their magnetic properties were evaluated.

(Manufacturing of Sm—Fe—N Magnet)

A method of manufacturing magnets according to examples 1 to 7 and comparative example 1 is described. Table 1 summarizes the main configuration in the magnet manufacturing method of magnets according to examples 1 to 7 and comparative example 1. Next, a method of manufacturing each magnet is described in detail.

TABLE 1

| | SEALING PROCESS | MAGNETIC FIELD APPLYING PROCESS | PRELIMINARY ROLLING PROCESS | | PRESSURIZING PROCESS | |
|---|---|---|---|---|---|---|
| | | | TEMPERATURE | ROLLING DIRECTION | TEMPERATURE | ROLLING DIRECTION |
| EXAMPLE 1 | WITHOUT TAPPING | ROOM TEMPERATURE | ROOM TEMPERATURE | ROLLING DIRECTION ⊥ DIRECTION OF MAGNETIC ORIENTATION | ROOM TEMPERATURE | ROLLING DIRECTION ⊥ DIRECTION OF MAGNETIC ORIENTATION |
| EXAMPLE 2 | WITH TAPPING | ROOM TEMPERATURE | ROOM TEMPERATURE | ROLLING DIRECTION ⊥ DIRECTION OF MAGNETIC ORIENTATION | ROOM TEMPERATURE | ROLLING DIRECTION ⊥ DIRECTION OF MAGNETIC ORIENTATION |
| EXAMPLE 3 | WITH TAPPING | ROOM TEMPERATURE | ROOM TEMPERATURE | ROLLING DIRECTION ⊥ DIRECTION OF MAGNETIC ORIENTATION | 200° C. | ROLLING DIRECTION ⊥ DIRECTION OF MAGNETIC ORIENTATION |
| EXAMPLE 4 | WITH TAPPING | ROOM TEMPERATURE | ROOM TEMPERATURE | ROLLING DIRECTION ⊥ DIRECTION OF MAGNETIC ORIENTATION | 400° C. | ROLLING DIRECTION ⊥ DIRECTION OF MAGNETIC ORIENTATION |
| EXAMPLE 5 | WITH TAPPING | ROOM TEMPERATURE | ROOM TEMPERATURE | ROLLING DIRECTION ⊥ DIRECTION OF MAGNETIC ORIENTATION | 700° C. | ROLLING DIRECTION ⊥ DIRECTION OF MAGNETIC ORIENTATION |
| EXAMPLE 6 | WITH TAPPING | ROOM TEMPERATURE | ROOM TEMPERATURE | ROLLING DIRECTION// DIRECTION OF MAGNETIC ORIENTATION | ROOM TEMPERATURE | ROLLING DIRECTION// ⊥ DIRECTION OF MAGNETIC ORIENTATION |
| EXAMPLE 7 | WITH TAPPING | ROOM TEMPERATURE | — | — | ROOM TEMPERATURE | ROLLING DIRECTION ⊥ DIRECTION OF MAGNETIC ORIENTATION |
| COMPARATIVE EXAMPLE 1 | WITHOUT TAPPING | ROOM TEMPERATURE | — | — | ROOM TEMPERATURE | ROLLING DIRECTION// DIRECTION OF MAGNETIC ORIENTATION |

molded article by machining or the like to take out the magnet body. In this way, the Sm—Fe—N magnet is manufactured.

Next, the Sm—Fe—N magnet manufactured by the above-described method of manufacturing an Sm—Fe—N magnet is described.

The Sm—Fe—N magnet is formed mainly from an Sm—Fe—N compound as a main component. The Sm—Fe—N magnet has a relative density of 68% or more to 70% or less and a degree of magnetic orientation of 0.74 or more to 0.76 or less. Thus, the residual magnetic flux density of the Sm—Fe—N magnet is set to 0.60 T or more to 0.62 T or less. The calculation method of the relative density and the degree of magnetic orientation of the Sm—Fe—N magnet is the same as in the first embodiment.

According to the method of manufacturing an Sm—Fe—N magnet having the above-described configuration and the Sm—Fe—N magnet, the magnetic characteristics of the Sm—Fe—N magnet is improved. The Sm—Fe—N magnet having the above-described configuration has excellent magnetic characteristics and thus is provided in a motor. The Sm—Fe—N magnet having the above-described con- First, a method of manufacturing a magnet according to example 1 is described. After the magnet powder was filled in the metal sheath, the sealing process was performed by sealing the end portion of the sheath by a manual press. As the magnet powder, $Sm_2Fe_{17}N_3$ powder was used. The particle size of the magnet powder was about 10 μm or less. A stainless steel sheath having a flat sectional shape was used as the metal sheath. SUS 304 was used for the stainless steel sheath. The size of the stainless steel sheath was about 15 mm wide, about 60 mm long, and about 10 mm high. The thickness of the stainless steel sheath was about 0.5 mm. One end portion in the longitudinal direction of the stainless steel sheath was pressure-bonded and the stainless steel sheath was filled with the magnet powder, and then the other end portion of the stainless steel sheath was pressure-bonded and sealed without tapping. Sealing of the sheath end portion of the stainless steel sheath was performed in the same manner as in the method illustrated in FIG. 3 above. The stainless steel sheath was filled with the magnet powder without gaps and sealed.

The relative density of the magnet powder sealed in the stainless steel sheath was calculated by the ratio of the bulk density ρ of the magnet powder to the theoretical density A of $Sm_2Fe_{17}N_3$ of 7.68 (g/cm$^3$) (ρ/A×100). The relative density of the magnet powder sealed in the stainless steel sheath was 20%. The calculation method of the relative density of the magnet powder is the same as the calculation method of the relative density of the magnet powder described above in the first embodiment.

The magnetic field applying process was performed in which a magnetic field was applied to the magnet powder sealed in the stainless steel sheath. The magnet powder was magnetized by magnetically orienting the magnet powder and aligning a direction of magnetic orientation in one direction. The direction of magnetic orientation was the longitudinal direction of the stainless steel sheath. The direction of magnetic orientation and the magnetization direction were the same. The magnetic field application method was performed in a pulse magnetic field. A magnetic field of 8 T (6.37 MA/m) was applied at room temperature.

Figure 11:
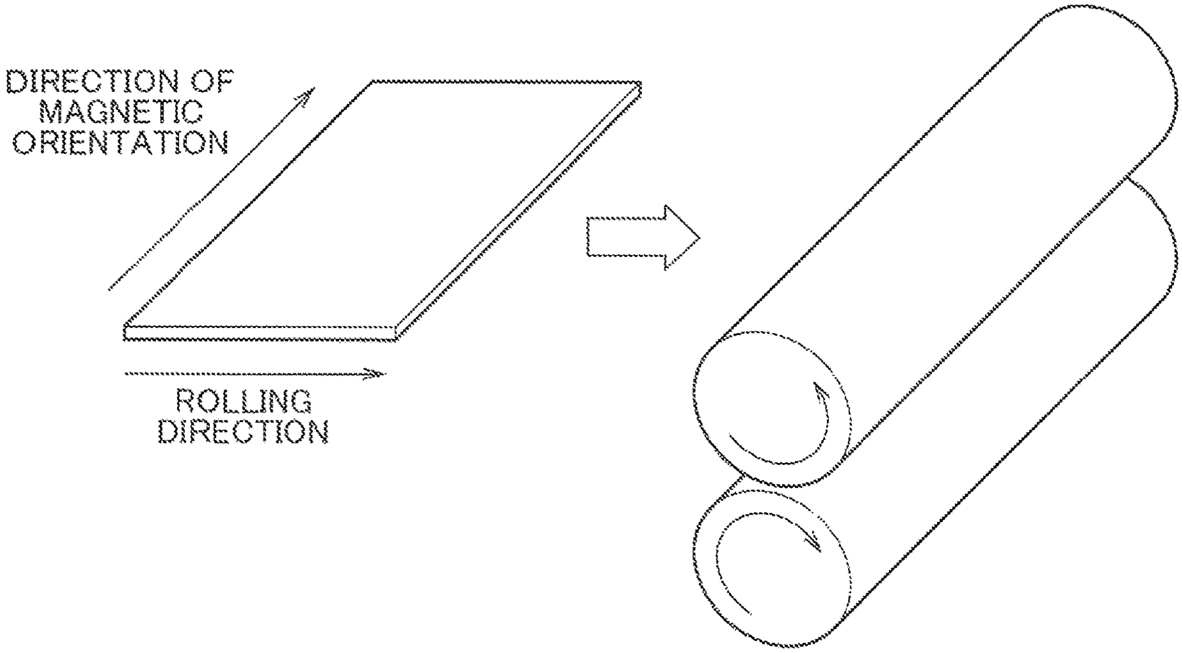
FIG. 11 is a schematic diagram illustrating a relationship between a rolling direction and a direction of magnetic orientation in examples of the present disclosure.

The preliminary rolling process was performed in which the magnetically oriented magnet powder sealed in the stainless steel sheath was preliminarily rolled and the magnetically oriented magnet powder was made into a green compact. The preliminary rolling was performed by a roll mill. The preliminary rolling was performed by skin pass rolling as light rolling at room temperature. The preliminary rolling was performed with a pressure smaller than a pressure of the pressurizing process described later. The line load of the preliminary rolling was 2450 (N/cm). The rolling direction was orthogonal to the direction of magnetic orientation. FIG. 11 is a schematic diagram illustrating the relationship between the rolling direction and the direction of magnetic orientation. The preliminary rolling was performed by light rolling so that the height of the stainless steel sheath was about 8.5 mm.

The pressurizing process was performed in which the green compact sealed in the stainless steel sheath was pressurized and densified to form a magnet body. As the pressurizing method, rolling was performed at room temperature with a roll mill. The rolling direction was orthogonal to the direction of magnetic orientation. The rolling was performed with a pressure larger than a pressure of the preliminary rolling. The line load of the rolling was 98000 (N/cm). The pushing amount (amount of decrease) of a one-pass roll gap was set to 0.3 mm, and the rolling was repeated until the rolling reduction ratio reached 50%. In this way, the magnet of example 1 was manufactured.

A method of manufacturing the magnet of example 2 is described. The magnet of example 2 differs from the magnet of example 1 in that the magnet of example 2 was tapped in the sealing process. In the manufacturing method of the magnet of example 2, the magnet powder filled in the stainless steel sheath was tapped by vibration and then sealed in sealing process. The tapping was performed by vibrating the magnet powder filled in the stainless steel sheath by shaking in the vertical direction. The stainless steel sheath and the magnet powder were the same as those of the magnet of example 1. The relative density of the magnet powder sealed in the stainless steel sheath was 50%. The relative density of the magnet powder was measured in the same manner as in the magnet of example 1. The magnetic field application process, the preliminary rolling process, and the pressurizing process in the magnet of example 2 were performed in the same manner as in the magnet of example 1.

A method of manufacturing the magnet of example 3 is described. The method of manufacturing the magnet of example 3 differs from the method of manufacturing the magnet of example 2 in the pressurizing process. In the manufacturing method of the magnet of example 3, the green compact sealed in the stainless steel sheath was heated to 200° C. in an electric furnace and then rolled. The sealing process, the magnetic field applying process, the preliminary rolling process, and the like, which are other components, were performed in the same manner as the method of manufacturing the magnet of example 2.

A method of manufacturing the magnet of example 4 is described. The method of manufacturing the magnet of example 4 differs from the method of manufacturing the magnet of example 2 in the pressurizing process. In the manufacturing method of the magnet of example 4, the green compact sealed in the stainless steel sheath was heated to 400° C. in an electric furnace and then rolled. The sealing process, the magnetic field applying process, the preliminary rolling process, and the like, which are other components, were performed in the same manner as the method for manufacturing the magnet of example 2.

A method of manufacturing the magnet of example 5 is described. The method of manufacturing the magnet of example 5 differs from the method of manufacturing the magnet of example 2 in the pressurizing process. In the manufacturing method of the magnet of example 5, the green compact sealed in the stainless steel sheath was heated to 700° C. in an electric furnace and then rolled. The sealing process, the magnetic field applying process, the preliminary rolling process, and the like, which are other components, were performed in the same manner as the method for manufacturing the magnet of example 2.

Figure 12:
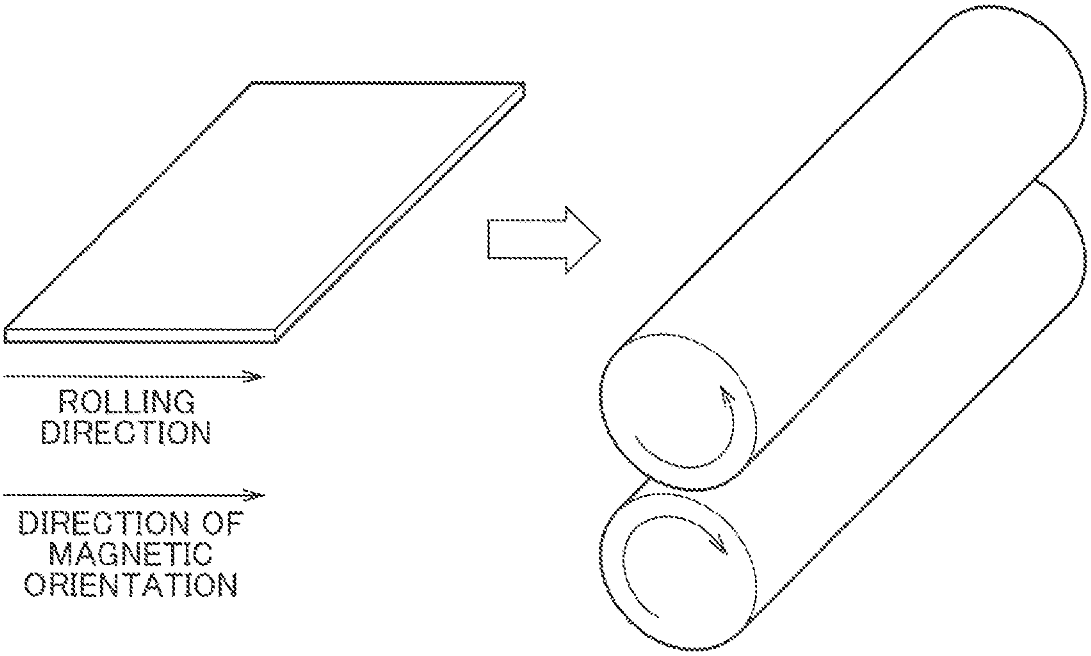
FIG. 12 a schematic diagram illustrating a relationship between a rolling direction and a direction of magnetic orientation in examples of the present disclosure.

A method of manufacturing the magnet of example 6 is described. The method of manufacturing the magnet of example 6 differs from the method of manufacturing the magnet of example 2 in the preliminary rolling process and the pressurizing process. In the manufacturing method of the magnet of example 6, the rolling direction of the preliminary rolling and the rolling direction of the pressurizing process were made parallel to the direction of magnetic orientation. FIG. 12 is a schematic diagram illustrating the relationship between the rolling direction and the direction of magnetic orientation. The sealing process and the magnetic field application process, and the like, which are other components, were performed in the same manner as the method of manufacturing the magnet of example 2.

A method of manufacturing the magnet of example 7 is described. The method of manufacturing the magnet of example 7 differs from the method of manufacturing the magnet of example 2 in that the preliminary rolling process is not performed. More specifically, in the method of manufacturing the magnet of example 7, the sealing process and the magnetic field application process were performed in the same manner as the method of manufacturing the magnet of example 2, and then the pressurizing process was performed without performing the preliminary rolling process.

In the pressurizing process, magnetically oriented magnet powder sealed in the stainless steel sheath was pressurized, and the magnetically oriented magnet powder was densified to form a magnet body. As the pressurizing method, rolling was performed at room temperature with a roll mill. The rolling direction was orthogonal to the direction of magnetic orientation. The pushing amount (amount of decrease) of a one-pass roll gap was set to 0.3 mm, and the rolling was repeated until the rolling reduction ratio reached 50%.

A method of manufacturing the magnet of comparative example 1 is described. The magnet of comparative example 1 differs from the method of manufacturing the magnet of example 1 in that the preliminary rolling process was not performed and in the method of pressurizing process. More specifically, in the manufacturing method of the magnet of comparative example 1, the sealing process and the magnetic field application process were performed in the same manner as in the manufacturing method of the magnet of example 1, and then the pressurizing process was performed without performing the preliminary rolling process.

In the pressurizing process, the magnetically oriented magnet powder sealed in the stainless steel sheath was pressurized, and the magnetically oriented magnet powder was densified to form a magnet body. As the pressurizing method, rolling was performed at room temperature with a roll mill. The rolling direction was made parallel to the direction of magnetic orientation. The pushing amount (amount of decrease) of a one-pass gap was set to 0.3 mm, and the rolling was repeated until the rolling reduction ratio reached 50%.

Next, the relative density, the degree of magnetic orientation, the degree of crystal orientation, and the residual magnetic flux density were evaluated for each magnet. Table 2 summarizes the characteristics of each magnet. Next, the characteristics of each magnet are described in detail.

TABLE 2

| | RELATIVE DENSITY (%) | PREFERRED ORIENTATION PARAMETER | MAGNETIC ORIENTATION DEGREE | RESIDUAL MAGNETIC FLUX DENSITY (T) |
|---|---|---|---|---|
| EXAMPLE 1 | 53 | 0.40 | 0.86 | 0.53 |
| EXAMPLE 2 | 87 | 0.55 | 0.79 | 0.79 |
| EXAMPLE 3 | 78 | — | 0.81 | 0.85 |
| EXAMPLE 4 | 82 | — | 0.79 | 0.91 |
| EXAMPLE 5 | 83 | — | 0.74 | 0.86 |
| EXAMPLE 6 | 68 | 0.66 | 0.73 | 0.55 |
| EXAMPLE 7 | 69 | 0.83 | 0.75 | 0.61 |
| COMPARATIVE EXAMPLE 1 | 48 | — | — | 0.44 |

(Relative Density of the Magnets)

The relative density was evaluated for each magnet. A specimen was taken from the center portion of the magnet. The size of the specimen was 7 mm in length, 7 mm in width, and 3 mm in thickness. The specimen was oriented so that the longitudinal direction of the specimen was in the direction of magnetic orientation. The density P of the specimen was calculated by measuring the mass and dimensions of the specimen. Then, the relative density was calculated by the ratio of the density P of the specimen to the theoretical density A of $Sm_2Fe_{17}N_3$ of 7.68 (g/cm$^3$) (P/A×100). The calculation method of the relative density of the specimen is the same as the calculation method of the relative density of the Sm—Fe—N magnet described above in the first embodiment.

The relative density of each magnet was 53% for the magnet of example 1, 87% for the magnet of example 2, 78% for the magnet of example 3, 82% for the magnet of example 4, 83% for the magnet of example 5, 68% for the magnet of example 6, 69% for the magnet of example 7, and 48% for the magnet of comparative example 1.

The magnets of examples 2 to 7 have higher relative densities than the magnets of example 1 and comparative example 1. Consequently, it was found that the tapping in the sealing process increased the relative density of the magnets.

(Degree of Magnetic Orientation)

The degree of magnetic orientation was evaluated for each magnet. Specimens were prepared in the same manner as the specimens used to evaluate the relative density. A pulse excitation type B-H curve tracer (pulse excitation type magnetic measuring device TPM-2-08s25VT manufactured by TOEI INDUSTRY CO., LTD.) was used to measure the B-H curve by applying a magnetic field to the specimen. A magnetic field of 8 T (6.37 MA/m) was applied at room temperature. Then, the saturation magnetic flux density Bs and the residual magnetic flux density Br were obtained from the B-H curve, and the degree of magnetic orientation Br/Bs was calculated. The method of calculating the degree of magnetic orientation of the specimen was the same as the method of calculating the degree of magnetic orientation of the Sm—Fe—N magnet described above in the first embodiment.

The degree of magnetic orientation of each magnet was 0.86 for the magnet of example 1, 0.79 for the magnet of example 2, 0.81 for the magnet of example 3, 0.79 for the magnet of example 4, 0.74 for the magnet of example 5, 0.73 for the magnet of example 6, and 0.75 for the magnet of example 7.

The magnet of example 2 has a degree of magnetic orientation larger than that of the magnet of example 6. Consequently, it was found that the degree of magnetic orientation tends to become larger when the rolling direction was orthogonal to the direction of magnetic orientation in the preliminary rolling process.

(Degree of Crystal Orientation)

The degree of crystal orientation was evaluated for each magnet. The center portion of the magnet was cut, and X-ray diffraction was performed by setting the magnet such that the orientation direction (direction of magnetic orientation) of the axis of easy magnetization and the scattering surface were orthogonal to each other. SmartLab (Rigaku) was used for the X-ray diffractometer. The X-ray source was CoKα radiation. The tube voltage was 40 kV. The tube current was 135 mA. The angular range was from 20 degrees to 90 degrees. The sampling step was 0.02 degrees.

Using a preferred orientation parameter of a preferred orientation function (March-Dollase function), which is a refinement parameter, in the Rietveld fitting of the X-ray diffraction pattern, a preferred orientation was analyzed by the WPF (Whole Pattern Fitting) method by the X-ray diffraction analysis program JADE made by LightStone. The preferred orientation parameter indicates that the degree of crystal orientation increases as it approaches 0, and the degree of crystal orientation decreases as it approaches 1. For the specified plane, the orientation of the (003) plane ([001] Direction) was evaluated. Then, the degree of crystal orientation of each magnet was evaluated by the preferred orientation parameter.

The preferred orientation parameter of each magnet was 0.40 for the magnet of example 1, 0.55 for the magnet of example 2, 0.66 for the magnet of example 6, and 0.83 for the magnet of example 7. Consequently, the magnets of examples 1 and 2 had higher degree of crystal orientation than the magnets of examples 6 and 7. Moreover, when the degree of crystal orientation and the degree of magnetic orientation of each magnet are compared, it is found that the degree of crystal orientation and the degree of magnetic orientation have almost the same tendency. Thus, the higher the degree of magnetic orientation, the higher the degree of crystal orientation.

(Residual Magnetic Flux Density)

The residual magnetic flux density was evaluated for each magnet. In the measurement of the residual magnetic flux density, the B-H curve was measured by applying a magnetic field to the specimen using a pulse excitation type B-H curve tracer (pulse excitation type magnetic measuring device TPM-2-08s25VT manufactured by TOEI INDUSTRY CO., LTD.) in the same manner as the evaluation of the degree of magnetic orientation. A magnetic field of 8 T (6.37 MA/m) was applied at room temperature. The intersection point between the B-H curve and the longitudinal axis is defined as the residual magnetic flux density. The method of determining the residual magnetic flux density was the same as the method of determining the residual magnetic flux density of the Sm—Fe—N magnet described above in the first embodiment.

The residual magnetic flux density of each magnet was 0.53 T for the magnet of example 1, 0.79 T for the magnet of example 2, 0.85 T for the magnet of example 3, 0.91 T for the magnet of example 4, 0.86 T for the magnet of example 5, 0.55 T for the magnet of example 6, 0.61 T for the magnet of example 7, and 0.44 T for the magnet of comparative example 1.

The magnets of examples 1 to 7 each had a larger residual magnetic flux density than the magnet of comparative example 1. Consequently, it was found that the magnets of examples 1 to 7 had improved magnetic properties. The magnets of examples 3 to 5 had a larger residual magnetic flux density than the magnet of example 2. From these results, it was found that heating and densifying the green compact in the pressurizing process increased the residual magnetic flux density. Further, the residual magnetic flux density in the magnet of example 2 was 0.79 T, and thus it was found that a magnet excellent in magnetic characteristics was also obtained when the pressurizing process was performed at room temperature.

The magnets of examples 1 to 6 subjected to the sealing process, the magnetic field applying process, the preliminary rolling process, and the pressurizing process have a relative density of 52% or more to 88% or less, a degree of magnetic orientation of 0.72 or more to 0.87 or less, and a residual magnetic flux density of 0.52 T or more to 0.92 T or less.

Furthermore, it was found that the magnets of examples 2 to 6 that were manufactured by tapping in the sealing process had a relative density of 67% or more to 88% or less, a degree of magnetic orientation of 0.72 or more to 0.82 or less, and a residual magnetic flux density of 0.54 T or more to 0.92 T or less.

The magnets of examples 2 to 5 that were manufactured by tapping in the sealing process and preliminarily rolling in the direction orthogonal to the direction of magnetic orientation in the preliminary rolling process had a relative density of 77% or more to 88% or less, a degree of magnetic orientation of 0.73 or more to 0.82 or less, and a residual magnetic flux density of 0.78 T or more to 0.92 T or less.

The magnet of example 7 that was manufactured by performing the sealing process, the magnetic field applying process, and the pressurizing process without performing the preliminary rolling process, and tapping in the sealing process, had a relative density of 68% or more to 70% or less, a degree of magnetic orientation of 0.74 or more to 0.76 or less, and a residual magnetic flux density of 0.60 T or more to 0.62 T or less.

Since the Sm—Fe—N magnet according to the present disclosure has excellent magnetic characteristics, it is useful for a motor and the like of a mobile body, such as an automobile or an aircraft, a generator, a rotating machine, an industrial robot, and the like.

What is claimed is:

1. A method of manufacturing an Sm—Fe—N magnet, comprising:

a sealing step of filling a metal sheath with a magnet powder comprising an Sm—Fe—N compound as a main component and sealing the metal sheath;

a magnetic field applying step of applying a magnetic field to the magnet powder sealed in the metal sheath and magnetizing the magnet powder by magnetically orienting the magnet powder and aligning a direction of magnetic orientation in one direction;

a preliminary rolling step of preliminarily rolling the magnetically oriented magnet powder sealed in the metal sheath to make the magnetically oriented magnet powder into a green compact; and a pressurizing step of pressurizing the green compact sealed in the metal sheath and densifying the green compact to form a magnet body, wherein in the preliminary rolling step, the preliminary rolling is performed by lightly rolling the magnetically oriented magnet powder sealed in the metal sheath with a pressure smaller than a pressure in the pressurizing step, and wherein in the preliminary rolling step, the magnetically oriented magnet powder sealed in the metal sheath is preliminarily rolled in a direction orthogonal to the direction of magnetic orientation.

2. The method of manufacturing an Sm—Fe—N magnet according to claim 1, wherein in the sealing step, the magnet powder filled in the metal sheath is tapped by vibration and then sealed.

3. The method of manufacturing an Sm—Fe—N magnet according to claim 1, wherein in the preliminary rolling step, the magnetically oriented magnet powder sealed in the metal sheath is preliminarily rolled at room temperature.

4. The method of manufacturing an Sm—Fe—N magnet according to claim 1, wherein in the pressurizing step, the green compact sealed in the metal sheath is pressurized at room temperature or heated to 700° C. or less and then pressurized.

5. The method of manufacturing an Sm—Fe—N magnet according to claim 1, wherein in the pressurizing step, the pressurizing is press forming or rolling.

6. The method of manufacturing an Sm—Fe—N magnet according to claim 5, wherein in the pressurizing step, the pressurizing is rolling and the rolling is performed in the direction orthogonal to the direction of magnetic orientation.

* * * * *